United States Patent
Kawasaki et al.

(10) Patent No.: US 8,806,686 B2
(45) Date of Patent: Aug. 19, 2014

(54) BREATHABLE CUSHION AND METHOD OF MANUFACTURING THE SAME

(75) Inventors: Hirotaka Kawasaki, Kariya (JP); Yukio Ishihara, Anjo (JP); Masao Tada, Toyota (JP); Ryoichi Wakayama, Tsushima (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 788 days.

(21) Appl. No.: 12/667,537

(22) PCT Filed: May 16, 2008

(86) PCT No.: PCT/JP2008/059056
§ 371 (c)(1),
(2), (4) Date: Feb. 26, 2010

(87) PCT Pub. No.: WO2009/004864
PCT Pub. Date: Jan. 8, 2009

(65) Prior Publication Data
US 2011/0258781 A1    Oct. 27, 2011

(30) Foreign Application Priority Data
Jul. 4, 2007    (JP) .................................. 2007-176115

(51) Int. Cl.
*B60N 2/56*    (2006.01)

(52) U.S. Cl.
USPC ...................... 5/652.1; 5/724; 5/726; 5/652.2

(58) Field of Classification Search
USPC .................. 5/648, 421, 423, 724, 726, 652.1, 5/652.2, 653; 297/180.13, 180.14, 297/452.47
See application file for complete search history.

(56) References Cited

U.S. PATENT DOCUMENTS

| 7,287,812 | B2 * | 10/2007 | Ishima et al. | 297/180.14 |
| 7,322,643 | B2 * | 1/2008 | Ishima et al. | 297/180.1 |
| 7,857,395 | B2 * | 12/2010 | Kikuchi et al. | 297/452.47 |
| 7,866,017 | B2 * | 1/2011 | Knoll | 29/91.1 |
| 2003/0102699 | A1 * | 6/2003 | Aoki et al. | 297/180.14 |
| 2004/0104607 | A1 * | 6/2004 | Minegishi et al. | 297/180.14 |
| 2004/0189061 | A1 * | 9/2004 | Hartwich et al. | 297/180.14 |
| 2005/0200166 | A1 * | 9/2005 | Noh | 297/180.14 |
| 2006/0138812 | A1 * | 6/2006 | Aoki | 297/180.14 |

(Continued)

FOREIGN PATENT DOCUMENTS

| EP | 1329356 | 7/2003 |
| JP | 63-77482 | 4/1988 |
| JP | 4-141411 | 5/1992 |
| JP | 7-14999 | 3/1995 |

OTHER PUBLICATIONS

Japan Office action, dated Nov. 13, 2012 along with an english translation thereof.

*Primary Examiner* — William Kelleher
(74) *Attorney, Agent, or Firm* — Greenblum & Bernstein, P.L.C.

(57) ABSTRACT

A seat cushion includes a cushion pad that is formed of breathable plastic foam, a breathable skin that is integrally layered on a front surface side of the cushion pad, and a non-breathable membrane-like film that is interleaved therebetween. The seat cushion includes a breathing hole formed in the film. The breathing hole extends from a back surface side of the cushion pad and passes through the cushion pad to penetrate the film. The breathing hole is formed while the cushion pad and the film are melted.

2 Claims, 4 Drawing Sheets

(56) References Cited

U.S. PATENT DOCUMENTS

2006/0290175 A1* 12/2006 Hartwich .................. 297/180.1
2007/0176471 A1* 8/2007 Knoll ...................... 297/180.14
2009/0121525 A1* 5/2009 Nishide et al. ........... 297/180.13
2009/0152931 A1 6/2009 Sahashi
2010/0038937 A1* 2/2010 Andersson et al. ...... 297/180.14

* cited by examiner

BREATHABLE CUSHION AND METHOD OF MANUFACTURING THE SAME

TECHNICAL FIELD

The present invention relates to a breathable cushion and a method of manufacturing the same. More particularly, the present invention relates to a breathable cushion including a pad layer that is formed of breathable plastic foam, a breathable skin layer that is integrally layered on a front surface side of the pad layer, and a non-breathable membrane-like film layer that is interleaved therebetween, and a method of manufacturing the same.

BACKGROUND ART

It is conventionally known that a seat back and a seat cushion of a vehicle seat is provided with breathability in order to prevent a passenger sitting on the vehicle seat from getting sweaty. A technique related to a breathable cushion and a method of manufacturing the same is disclosed in Japanese Laid-Open Patent Publication No. 63-77482. The technique is directed to provide breathability to the seat cushion having poor breathability. The seat cushion disclosed therein is composed of a breathable pad that is formed of urethane foam, a breathable fabric skin covering a front surface side of the pad, and a non-breathable film layer that is interleaved therebetween.

The film layer is previously integrally layered on the breathable skin such that the skin can be integrally adhered to the pad when the pad is foam-molded. That is, the non-breathable film layer is layered on the breathable skin, so that the skin can be previously set on a die for molding the pad by vacuuming. Therefore, the seat cushion thus formed has poor breathability because the pad is integrated with an upper surface side of the film layer.

Therefore, in order to provide the poor-breathable seat cushion thus formed with breathability, needles are pierced into the seat cushion from a front surface side thereof, so that the film layer can be pierced. At this time, the needles are previously heated such that the film layer can be pierced while being fused. As a result, holes formed in the film layer can be prevented from being closed again.

However, in the conventional technique disclosed in the above-described document, the heated needles are pierced into the seat cushion from the front surface side thereof. Therefore, the skin can be melted, so that texture thereof can be easily unraveled. Further, the holes cannot be reliably formed. This may lead to an inferior appearance of the seat cushion.

Thus, there is a need in the art to provide a breathable cushion having a good appearance, and a method manufacturing such a cushion.

SUMMARY OF INVENTION

A breathable cushion of the present invention includes a pad layer that is formed of breathable plastic foam, a breathable skin layer that is integrally layered on a front surface side of the pad layer, and a non-breathable membrane-like film layer that is interleaved therebetween. The breathable cushion includes a breathing hole formed in the film layer. The breathing hole extends from a back surface side of the pad layer and passes through the pad layer to penetrate the film layer. The breathing hole is formed while the pad layer and the film layer are melted.

In the construction of the present invention, the breathing hole is formed in the non-breathable film layer. The breathing hole extends from the back surface side of the breathable pad layer and penetrates the film layer. Thus, each of the layers may have breathability. The breathing hole is formed while the pad layer and the film layer are melted. Therefore, the breathing hole can be prevented from being closed again, so that a hole shape having a predetermined diameter can be maintained. Further, the breathing hole extends from the back surface side of the pad layer and penetrates the film layer. Therefore, the breathing hole is invisible from the front surface side. Thus, the breathing hole extends from the back surface side of the breathable pad layer and penetrates the film layer. In addition, the breathing hole is formed while each of the layers are melted. Therefore, a poor-breathable cushion can be provided with good breathability without deteriorating the appearance thereof.

Further, the present invention can be constructed as follows. That is, the breathable cushion is formed as a cushion member of a seat cushion, a seat back or a headrest of a vehicle seat.

In the construction of the present invention, the breathable cushion is used as a cushion member of a seat cushion, a seat back or a headrest of a vehicle seat. Therefore, the vehicle seat is capable of preventing a passenger from getting sweaty. Further, an appearance of the vehicle seat can be prevented from being deteriorated. Thus, the vehicle seat has a good appearance and is capable of preventing a passenger from getting sweaty.

Further, the present invention provides a method of manufacturing a breathable cushion including a pad layer that is formed of breathable plastic foam, a breathable skin layer that is integrally layered on a front surface side of the pad layer, and a non-breathable membrane-like film layer that is interleaved therebetween. The method includes a piercing process in which a pre-heated elongated piercing member is pierced into the pad layer from a back surface side thereof to form a breathing hole that penetrates the pad layer and the film layer.

According to the present invention, in the piercing process, the pre-heated piercing member is pierced into the breathable pad layer from the back surface side thereof to form the breathing hole that penetrates the non-breathable film layer. Thus, each of the layers may have breathability. The breathing hole is formed while the pad layer and the film layer are melted by the pre-heated piercing member. Therefore, the breathing hole can be prevented from being closed again, so that a hole shape having a predetermined diameter can be maintained. Further, the breathing hole extends from the back surface side of the pad layer and penetrates the film layer. Therefore, the breathing hole is invisible from a front surface side of the skin layer. Thus, the breathing hole formed in the piercing process extends from the back surface side of the breathable pad layer and penetrates the film layer. In addition, the breathing hole is formed while each of the layers are melted. Therefore, a poor-breathable cushion can be provided with good breathability without deteriorating the appearance thereof.

Further, the present invention can be constructed as follows. That is, the piercing member is pre-heated by electromagnetic induction heating.

According to the present invention, the piercing member is pre-heated by the electromagnetic induction heating. Therefore, the piercing member can be remotely heated. Thus, because the piercing member is pre-heated by the electromagnetic induction heating, the piercing member can be remotely heated easily and quickly.

Further, the present invention can be constructed as follows. That is, a heating coil for generating a magnetic force used in the electromagnetic induction heating is disposed on a setting die on which the skin layer is set when the piercing process is performed. Further the piercing member is moved toward the heating coil, so as to be pierced into the pad layer from the back surface side thereof. The method further includes a compression process in which the pad layer is compressed and deformed from the back layer thereof toward the front layer thereof before the piercing member is pierced into the pad layer from the back surface side thereof, so as to increase heating efficiency of the piercing member.

According to the present invention, in the compression process that is performed before the piercing member is pierced into the pad layer from the back surface side thereof, the piercing member can be positioned closer to the heating coil. As a result, the piercing member can be pierced into the pad layer while efficiently heated by the heating coil. Thus, because the pad layer is compressed and deformed in the compression process prior to the piercing process, the piercing member can be heated by the electromagnetic induction heating while being positioned closer to the heating coil. As a result, the piercing member can be heated with high heating efficiency, so that the breathing holes can be reliably formed.

BEST MODE FOR CARRYING OUT THE INVENTION

In the following, a best mode for carrying out the present invention will be described with reference to the drawings.
Embodiment 1

First, a breathable cushion according to Embodiment 1 and a method of manufacturing the same will be described with reference to FIGS. 1 to 7. In the following description, terms "a front surface" and "a back surface" of each of components respectively correspond to an upper surface and a lower surface shown in FIG. 1. The breathable cushion of the present embodiment is formed as a cushion member of a seat cushion 1 of a vehicle seat.

Figure 1:
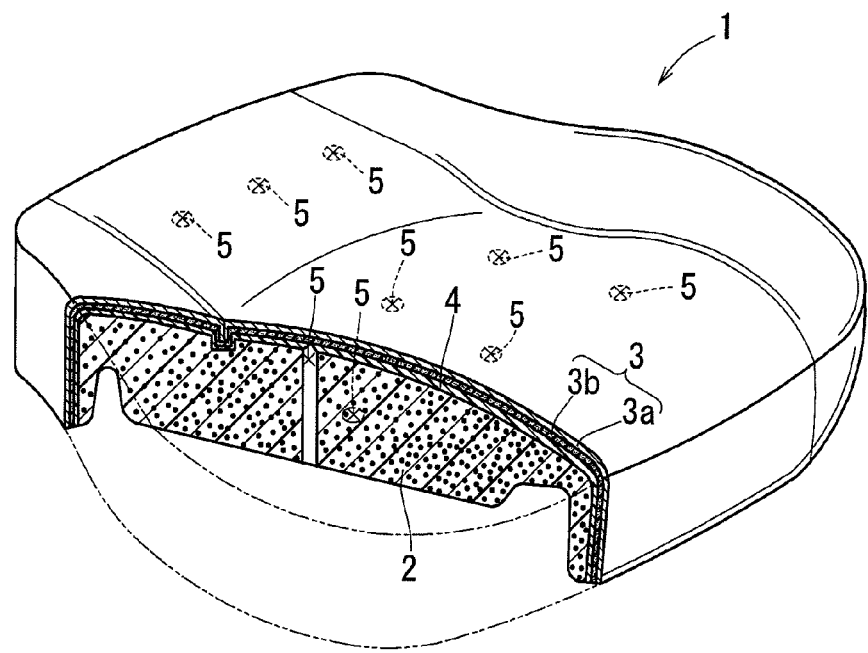
FIG. 1 is a perspective view of a breathable cushion according to Embodiment 1, which schematically illustrates the same.
Figure 2:
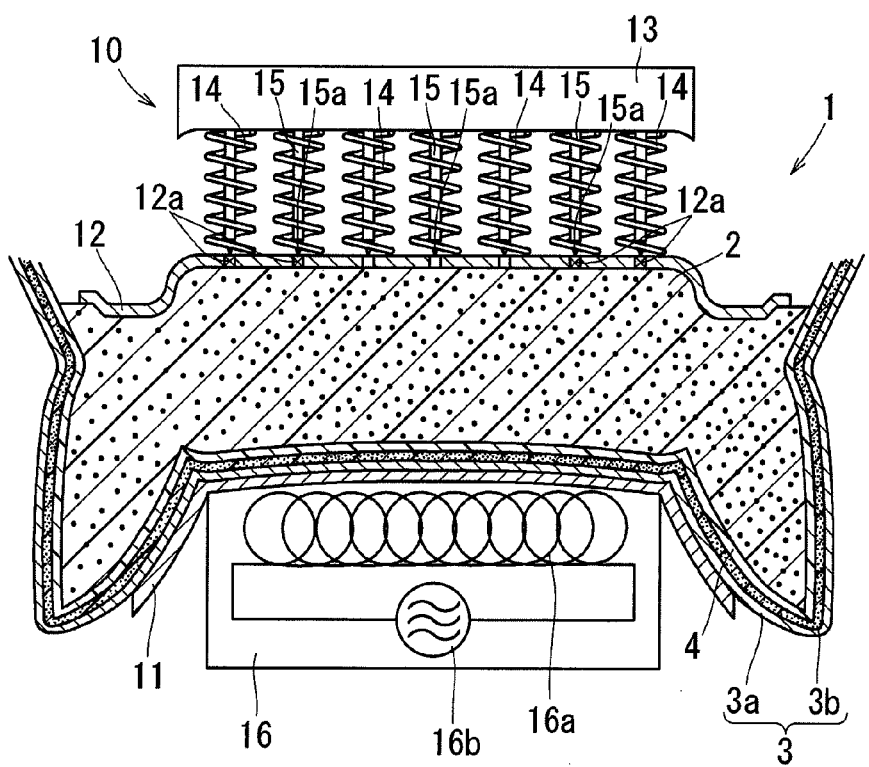
FIG. 2 is a view of a manufacturing machine of the breathable cushion, which schematically illustrates the same.

As shown in FIG. 1, the seat cushion 1 has a cushion pad 2 that is made of plastic foam. The cushion pad 2 is covered by a fabric skin 3 that is integrally attached to a front surface side thereof. Further, the cushion pad 2 is formed of polyurethane resin by foam molding and has a known breathable structure. The skin 3 is composed of a breathable face cover 3a that is made of fabric, and a breathable cover pad 3b that is made of urethane slab. The cover pad 3b is integrally adhered to a back surface side of the face cover 3a.

The cover pad 3b may function to keep the seat cushion 1 soft to the touch. The cover pad 3b is formed of polyurethane resin by foam molding and has a thickness of 3 to 5 mm. The cover pad 3b foamed at a foaming ratio higher than the cushion pad 2 so as to be softer than the cushion pad 2. Further, the cover pad 3b is applied to the back surface of the face cover 3a while a front surface of the cover pad 3b is melted by heating, so as to be integrally layered on the face cover 3a.

As a result, the skin 3 has a layered structure and each of layers thereof is proved with breathability. The face cover 3a is formed to have a thickness of approximately 1.5 mm. Conversely, the cushion pad 2 is formed to have a thickness of 50 to 70 mm.

Thus, the cushion pad 2 and the skin 3 are respectively constructed to be breathable. However, a non-breathable membrane-like film 4 that is made of urethane resin is disposed between the cushion pad 2 and the skin 3 as an inner layer. The film 4 is formed to have a thickness of 30 μm and has stretchability as a whole. As a result, the seat cushion 1 has poor breathability because of the interleaved film.

The film 4 is previously integrally layered on a back surface of the skin 3 such that the breathable skin 3 can be integrally adhered to the cushion pad 2 when the cushion pad 2 is foam-molded. That is, the non-breathable film 4 is layered on the breathable skin 3, so that the skin 3 can be previously set on a molding die of the cushion pad 2 by vacuuming. Therefore, the seat cushion 1 thus formed has poor breathability because the cushion pad 2 is integrated with a back surface side of the film 4.

Therefore, in order to provide the poor-breathable seat cushion 1 with breathability, the seat cushion 1 is treated to pierce a plurality of breathing holes 5•• that extend from a back surface side toward a front surface side thereof. (Symbol "••" means plural number.) In this embodiment, the breathing holes 5•• are formed in nine portions on a sitting area of seat cushion 1 on which a passenger sits.

The breathing holes 5•• extend from the back surface side of the cushion pad 2 and pass through the cushion pad 2 to penetrate the film 4. Therefore, the breathing holes 5 . . . are invisible from the front surface side of the seat cushion 1. As a result, the seat cushion 1 can be provided with breathability without deteriorating an appearance thereof. Further, the cushion pad 2 corresponds to a pad layer of the present invention. The skin 3 corresponds to a skin layer of the present invention. The film 4 corresponds to a film layer of the present invention.

In the following, a method of piercing the breathing holes 5•• will be described in detail. Piercing of the breathing holes 5•• is performed using a processing machine 10 shown in FIG. 2. The processing machine 10 includes a setting die 11 on which the integrally formed seat cushion 1 described above is set, a presser die 12 that is capable of pressing the seat cushion 1 during processing, a movable portion 13 that is capable of moving the presser die 12, needles 15•• as piercing members, and a magnetic force generation unit 16 for heating the needles 15•• by electromagnetic induction heating.

The seat cushion 1 is set on the setting die 11 while the skin 3 faces downwards. Thereafter, in this set condition of the seat cushion 1, the presser die 12 is lowered by the movable portion 13 to press an upper surface portion of the seat cushion 1. Thus, the seat cushion 1 can be maintained in a condition in which the seat cushion 1 is pressed from above and below. Further, the presser die 2 is connected to the movable portion 13 via a plurality of compression springs 14••. Thus, the presser die 12 can apply power of the movable portion 13 to the upper surface portion of the seat cushion 1 as a pressing force via a spring force of the compression springs 14••.

Further, the needles 15•• are attached to the movable portion 13 described above so as to extend downwards through inner spaces of the compression springs 14••. Upper end portions of the needles 15•• are integrally secured to the movable portion 13. As the movable portion 13 is forcibly lowered against the spring force of the compression springs 14•• toward the presser die 12 under a restraint condition in which the upper surface portion of the seat cushion 1 is pressed by the presser die 12, the needles 15•• move downwards through insertion holes 12a that are formed in the presser die 12.

As a result, the needles 15 are pierced into the seat cushion 1 from the upper surface portion thereof. At this time, before the needles 15•• are pierced into the seat cushion 1, metal chips 15a•• attached to lower end portions of the needles 15•• are subjected to a magnetic force from the magnetic force generation unit 16 disposed on the setting die 11, so as to be remotely pre-heated. Further, portions of the needles 15•• other than the lower end portions thereof are made of a non-conductive material, so that the magnetic force can be concentrated on the metal chips 15a••.

Further, the magnetic force generation unit 16 is a known device that is used in general electromagnetic induction heating. That is, when a high-frequency current having a constant frequency is fed to a heating coil 16a from a power source 16b, a magnetic line is generated from the heating coil 16a. When the magnetic line passes through the metal chips 15a••, an eddy current is generated. The eddy current thus generated is transformed into resistance heat, so that the metal chips 15a•• can be heated by an exothermal effect.

Figure 3:
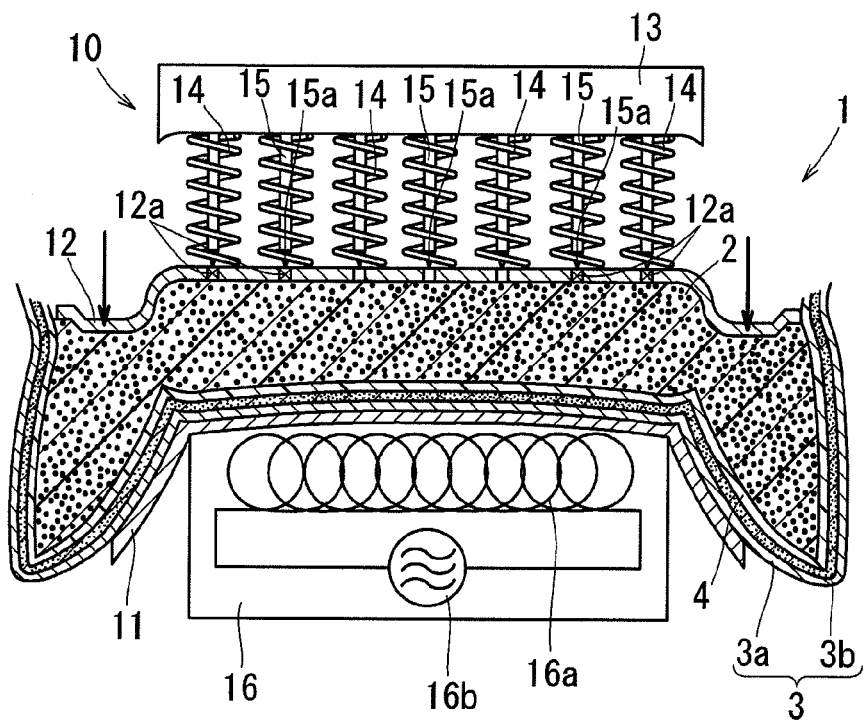
FIG. 3 is a view illustrating a compressing process of the breathable cushion.
Figure 4:
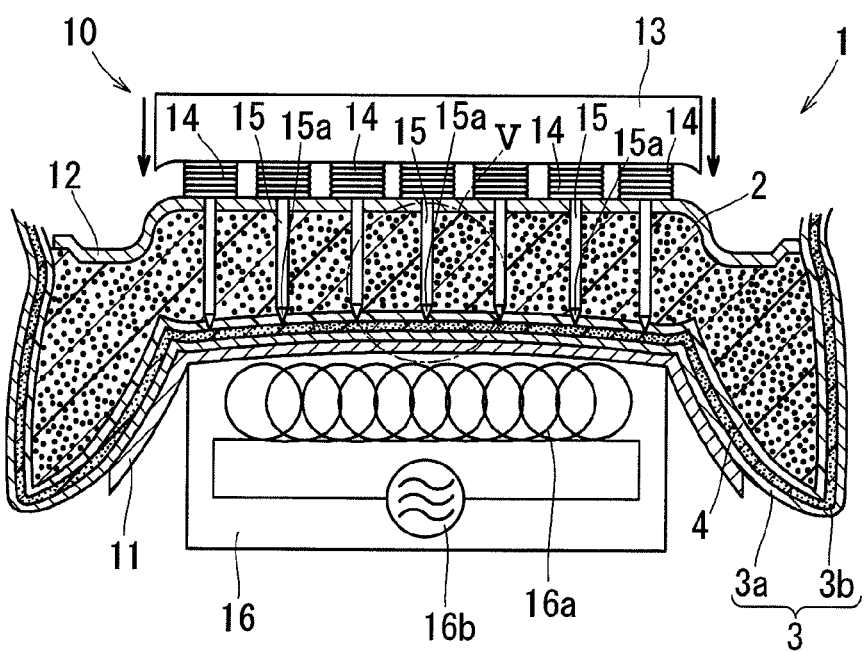
FIG. 4 is a view illustrating a piercing process of the breathable cushion.
Figure 5:
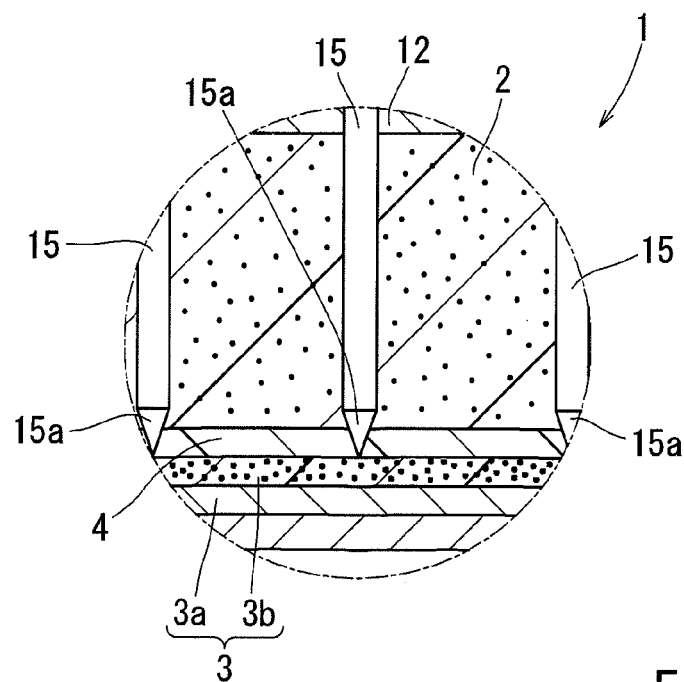
FIG. 5 is an enlarged view of a portion V in FIG. 4.

As shown in FIG. 3, pre-heating of the needles 15•• is performed in a condition in which the seat cushion 1 is pressed by the presser die 12 so as to be compressed in a thickness direction. That is, when the movable portion 13 is lowered, the presser die 12 compresses and deforms the seat cushion 1 with the aid of the spring force of the compression springs 14•• (a compression process). As a result, before the needles 15•• are pierced into the seat cushion 1, the needles 15•• can be positioned closer to the heating coil 16a, so as to be heated with high heating efficiency.

When the movable portion 13 is further lowered from the condition in which the seat cushion 1 is compressed, the movable portion 13 is forcibly lowered against the spring force of the compression springs 14•• toward the presser die 12. As a result, the needles 15 are pierced into the cushion pad 2 from an upper surface portion thereof, so as to pass through the cushion pad 2 to penetrate the film 4, thereby forming the breathing holes 5•• in the film 4 (a piercing process). At this time, the needles 15•• are pre-heated. Therefore, the needles 15•• are pierced into the cushion pad 2 and the film 4 while melting the same.

Figure 6:
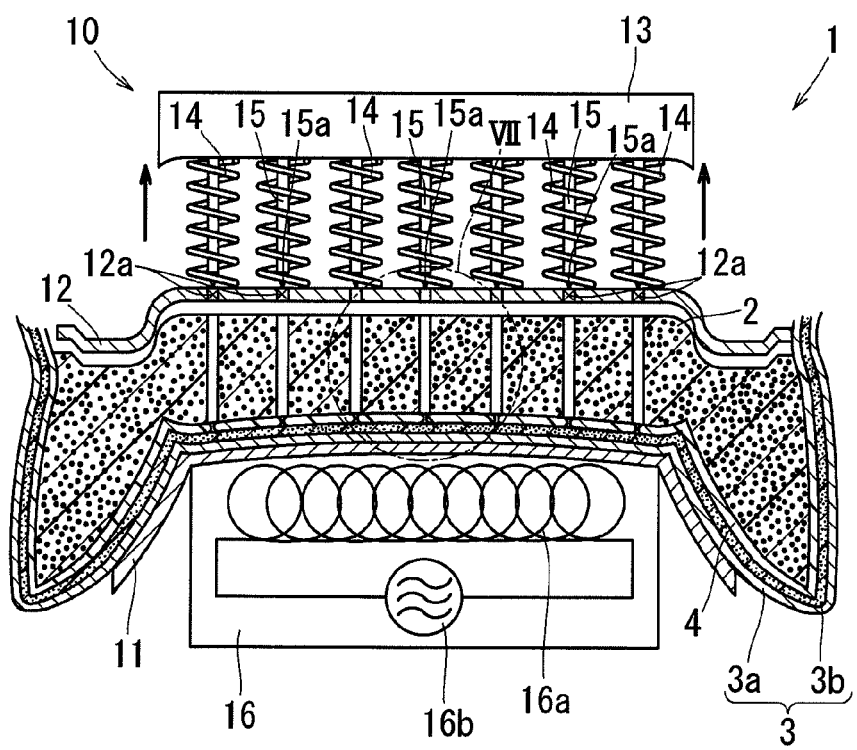
FIG. 6 is a view illustrating a condition in which dies are opened after a film is pierced.
Figure 7:
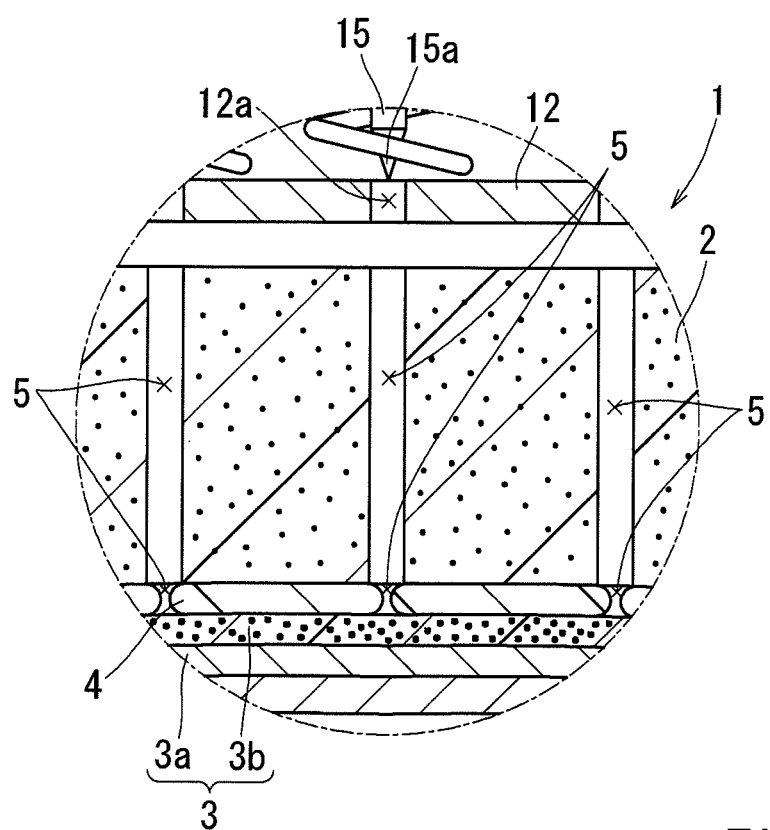
FIG. 7 is an enlarged view of a portion VII in FIG. 6.

Thus, the breathing holes 5•• each having a diameter of 2 to 5 mm are formed in the cushion pad 2 and the film 4. The breathing holes 5•• thus formed can be prevented from being closed again even when the needles 15•• are pulled out of the cushion pad 2 and the film 4. A condition in which the breathing holes 5•• are formed by the needles 15•• is clearly shown in FIG. 5 that is an enlarged view of a portion V in FIG. 4. Further, a condition in which after the breathing holes 5•• are formed, the movable portion 13 is raised and the needles 15•• are pulled out of the seat cushion 1 is best shown in FIG. 6 and FIG. 7 that is an enlarged view of a portion VII in FIG. 6. Further, use of the present embodiment is previously described in the description with regard to the construction of the seat cushion 1 and the method of piercing the breathing holes 5••. Therefore, a description thereof will be omitted.

According to the breathable cushion of the present embodiment, the breathing holes 5•• extending from the back surface side of the cushion pad 2 (the pad layer) and penetrating the film 4 (the film layer) are formed while the cushion pad 2 and the film 4 are melted. Thus, the poor-breathable seat cushion 1 can be provided with good breathability without deteriorating the appearance thereof. Further, when the breathable cushion is applied to the breathable seat cushion 1 of the vehicle seat, the vehicle seat has a good appearance and is capable of preventing a passenger from getting sweaty.

Further, the needles 15•• (the piercing members) are heated by the electromagnetic induction heating. Therefore, the needles 15•• can be remotely heated easily and quickly. Further, the cushion pad 2 is compressed and deformed in the compression process prior to the piercing process. Therefore, the needles 15•• can be heated by the electromagnetic induction heating while being positioned closer to the heating coil 16a. As a result, the needles 15•• can be heated with high heating efficiency, so that the breathing holes 5•• can be reliably formed.

A representative embodiment of the present invention has been described. However, the description should not be construed restrictively. For example, in the embodiment described above, the present invention is applied to the seat cushion of the vehicle seat in order to provide breathability thereto. However, the present invention can be applied to a seat back or a headrest in order to provide breathability thereto. Also, the present invention can be applied to cushion members other than the vehicle seat.

Further, in the embodiment, the cushion pad is compressed and deformed in the compression process prior to the piercing process, so that the needles 15•• can be heated with high heating efficiency by the electromagnetic induction heating. However, when the cushion pad is thin, the needles can be sufficiently heated without performing the compression process. In addition, the needles can be pre-heated by known heating methods other than the electromagnetic induction heating.

The invention claimed is:
1. A breathable cushion comprising:
a pad layer that is formed of breathable plastic foam;
a breathable skin layer that is integrally layered on a front surface side of the pad layer and is softer than the pad layer;
a stretchable non-breathable film layer that adheres the pad layer to the breathable skin layer; and
a breathing hole formed in the film layer, wherein the breathing hole extends from a back surface side of the breathable plastic foam and passes through the breathable plastic foam to penetrate the film layer, wherein the non-breathable film layer has a thickness of 30 μm.
2. The breathable cushion as defined in claim 1, wherein the breathable cushion is formed as a cushion member of at least one of a seat cushion, a seat back and a headrest of a vehicle seat.

* * * * *